Aug. 4, 1959  E. DREXLER  2,897,783
CONTROL APPARATUS FOR EXTRUSION PRESS MACHINERY
Filed Oct. 9, 1953  2 Sheets-Sheet 1
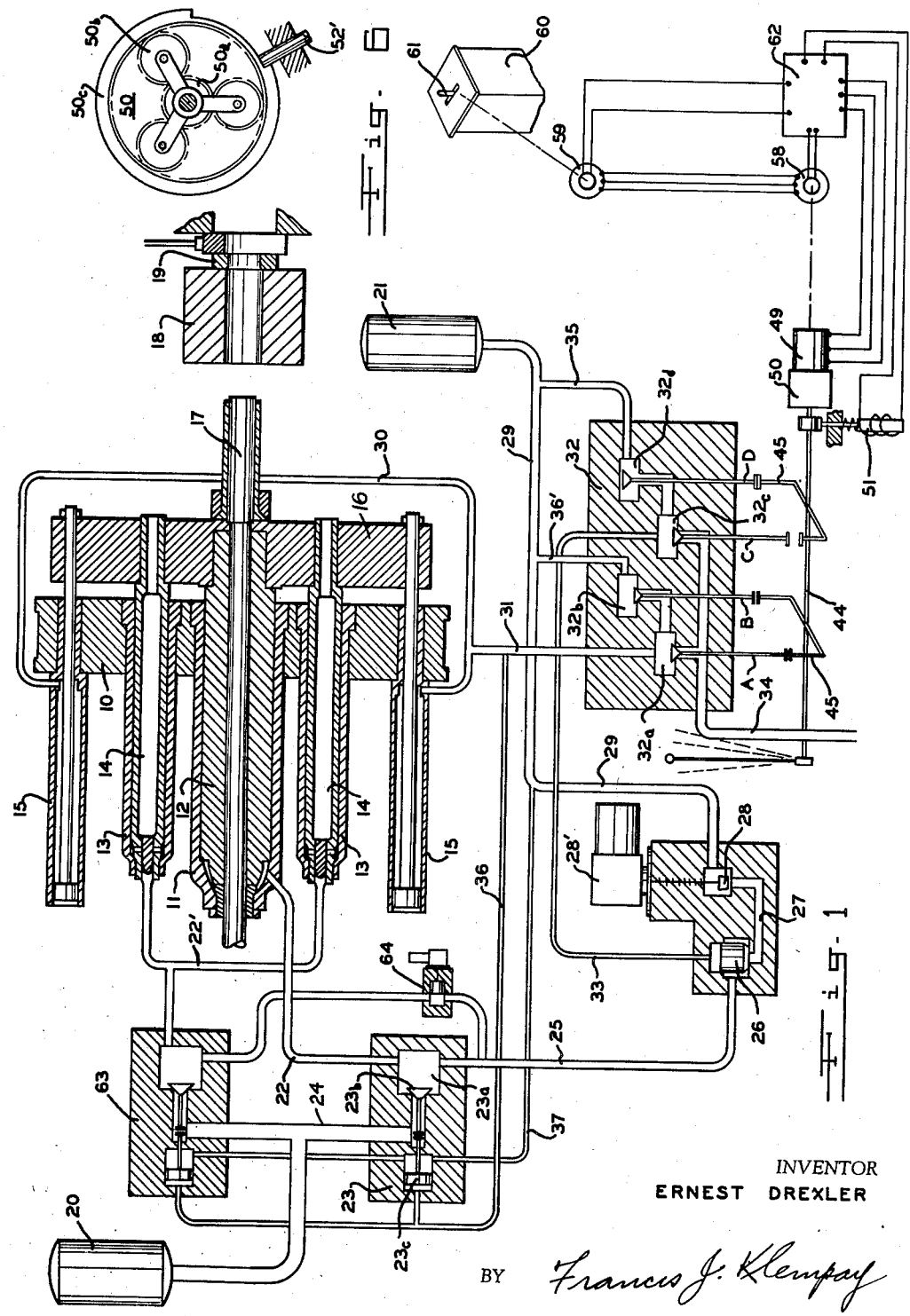
INVENTOR
ERNEST DREXLER
BY Francis J. Klempay
ATTORNEY

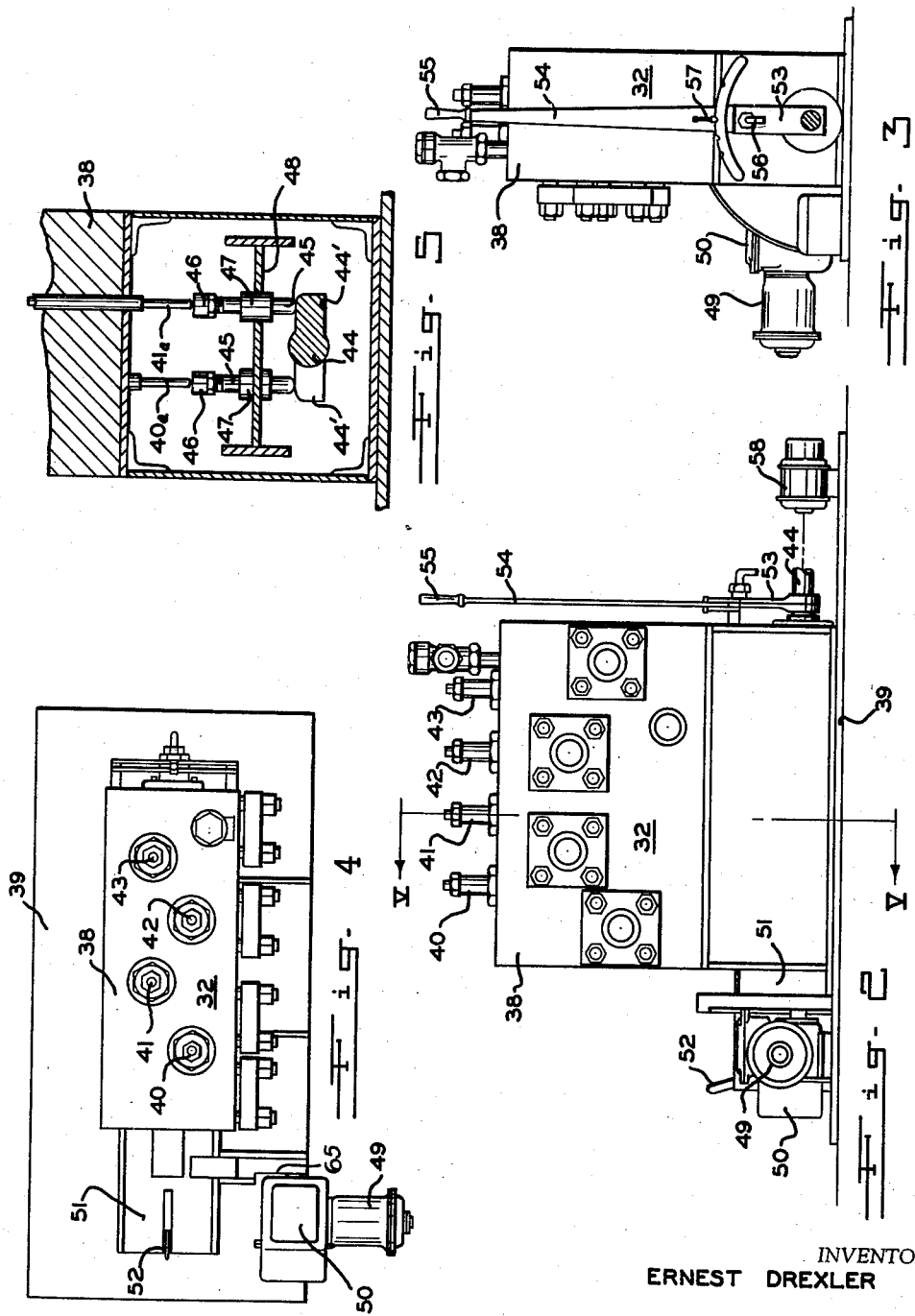

United States Patent Office 2,897,783
Patented Aug. 4, 1959

2,897,783
CONTROL APPARATUS FOR EXTRUSION PRESS MACHINERY

Ernest Drexler, Leominster, Mass., assignor to Lombard Corporation, Youngstown, Ohio, a corporation of Ohio Application October 9, 1953, Serial No. 385,090

5 Claims. (Cl. 121—38)

The present invention relates to extrusion press equipment, and more particularly to new and improved control apparatus for high pressure extrusion press apparatus.

As an overall object the present invention seeks to provide an improved control system for controlling the operation of large extrusion presses, and particularly where the use of extremely high operating pressure is contemplated.

More specifically, it is an object of the present invention to provide a novel control system for high pressure extrusion presses whereby control of the press through its various phases or stages of movement may be effected from a central remotely positioned control pulpit or console, and in a manner which is more effective than has heretofore been practicable. The invention does not, of course, purport to teach the remote control of extrusion press apparatus as such, but rather it seeks to teach a novel control system, including certain novel and improved elements thereof, whereby such remote control may be more effectually practiced.

Another object of the invention resides in the provision of a novel control arrangement for high pressure extrusion presses whereby movement of the press ram may be at all times controlled with smoothness and precision through remote operating devices or through manual operating devices as may be desired. In this respect the invention contemplates the smooth and precise control of extrusion press apparatus operating under pressures in the order of 5000 p.s.i., the control apparatus being arranged to contain and accurately regulate the flow of operating fluid under such high pressure.

Yet another object of the present invention is the provision in a control system for high pressure extrusion press apparatus of a novel control valve device and operating mechanism therefor whereby the press may be operated manually or from a remote control console as may be desired, and particularly whereby in the event of power failure or other breakdown remote operation of the press apparatus may be quickly and easily taken over by manual operation or control. Further in this regard, the invention contemplates the provision of a novel control valve assembly adapted for operation manually or by remote servo mechanism wherein one or more control effects may be accomplished with a relatively small movement of the valve mechanism. The arrangement, as will hereafter more fully appear, is such that while the valve apparatus is normally remotely operated, a simple and quick manual take-over is provided. And by providing for a relatively small movement of the valving parts manual operation of the valve, when necessary or desirable, may be effectively accomplished.

Yet another object of the invention is the provision in a control system for high pressure extrusion press apparatus of a novel valve apparatus which may be operated by means of a suitable servo device, controlled from a remote control console, and which is operative not only to control the press apparatus through a plurality of stages of movement but to effect such control in a precise manner, including throttling effects where desired.

More particularly, in connection with the above object, the invention contemplates the provision of a novel multiport poppet type valve assembly having a plurality of valve elements therein operated by a single mechanism, the valves being operated in desired sequence, and being capable of accurately controlled movement so that a suitable throttling effect may be obtained where desired in certain stages of the press cycle.

The above and other objects and advantages of the invention will become apparent upon full consideration of the following detailed specification and accompanying drawing wherein is shown a preferred embodiment of my invention.

In the drawing:

Figure 1 is a simplified schematic representation of a high pressure hydraulic extrusion press installation incorporating the control system and apparatus of my invention;

Figure 2 is a front elevation of one embodiment of the improved valve assembly of my invention, forming a part of the system illustrated in Figure 1;

Figure 3 is an end elevation of the valve apparatus of Figure 2;

Figure 4 is a top plan view of the valve apparatus of Figure 2;

Figure 5 is an enlarged fragmentary section view taken generally along line V—V of Figure 2; and Figure 6 is a simplified fragmentary section view of a driving device forming a part of the valve apparatus of Figure 2.

Referring now to the drawing, and initially to Figure 1 thereof, the reference numeral 10 designates the main frame of a conventional high pressure extrusion press installation, which frame rigidly supports the main cylinder 11 and ram 12 of the press. Positioned on opposite sides of the main cylinder 11 are auxiliary cylinders and rams 13 and 14 respectively. And positioned outwardly of the auxiliary cylinders are pull-back cylinders 15, which may be of relatively small diameter as compared to the main and auxiliary cylinders 11 and 13. Each of the above mentioned cylinders is firmly secured to and carried by the main frame member 10, while the movable members or rams of these same cylinders are secured to a rigid cross head 16 which is generally supported and guided in longitudinal movement by suitable means, not shown, and which carries at its forward end an extruding plunger 17. Positioned forwardly of the plunger 17 is a billet container 18 and a suitable die 19 which are conventionally arranged so that upon movement of the plunger 17 into the container 18 a billet positioned within the container is extruded through the die opening, in the shape or cross section defined thereby.

To carry the main ram 12 and plunger 17 through a forward or extruding movement there are conventionally provided separate sources 20 and 21 of hydraulic fluid under pressure. The fluid source 20 is commonly known as a "pre-fill" source and is preferably maintained under low pressure, for example 250 p.s.i., and is connected to the main ram cylinder 11, and the auxiliary cylinders 13, during the initial stages of forward movement of the plunger 17, wherein there is no substantial resistance to movement thereof. After the plunger meets a billet positioned within the container there is substantial resistance to further movement of the plunger, and at this time it is desirable to connect the main cylinder 11 and auxiliary cylinders 13 to the high pressure source, designated by the numeral 21, which may for the purposes of the present illustration be maintained at a pressure in the order of 4500 to 5000 p.s.i.

Communicating with the main and auxiliary cylinders 11 and 13 are fluid conduits 22 and 22' respectively through which both pre-fill and extruding pressure is applied. At its outer end the conduit 22 connects with a filling valve 23 which is preferably of a pilot operated type and which has connections, represented by conduits 24 and 25 respectively, with both prefill and high pressure operating fluid. In the illustrated embodiment of the invention the conduit 25 has direct communication with conduit 22 through a chamber 23a in the valve 23. While the conduit 24, communicating directly with the source of pre-fill fluid 20, communicates with the conduit 22 through a valve port 23b. Conduit 25 communicates with the source of high pressure fluid 21 through a pilot operated valve 26, passage 27, throttling valve 28 and conduit 29.

A second filling valve 63, similar in all material respects to filling valve 23, connects the auxiliary cylinders 13 with the high pressure conduit 25 and pre-fill source 20. The pilot pistons of valves 23 and 63 are connected in parallel so that all movements of the valves are similar and simultaneous. It will be understood, however, that under certain conditions it may be unnecessary or undesirable to apply high pressure fluid to the auxiliary cylinders 13. Accordingly, there is provided a shut-off valve 64 in the high pressure inlet to the valve 63. When the valve 64 is in an off position valve 63 merely permits the flow of pre-fill fluid to auxiliary cylinders 13 as high pressure fluid is applied to the main cylinder 11. This, of course, prevents the formation of vacuum in the auxiliary cylinders.

In the present illustration the extrusion press apparatus is in a loading position, with the main ram 12 fully retracted. And it is desired at such time that the main and auxiliary rams 12 and 14 be under low or pre-fill pressure, the rams being prevented from moving forward, however, by fluid which is trapped in the pull back cylinders 15. Thus, in the illustrated apparatus, the operating stem of the valve 23 has discontinuous connection with the pilot piston 23c therefor so that the stem acts in the capacity of a check valve, permitting a free flow of fluid at pre-fill pressure to the cylinders 11 and 13.

Leading to the forward ends of the pull back cylinders 15 is a conduit 30 which, in turn, communicates with a conduit 31, leading to a port 32a in a special multi-port valve 32 which forms an important part of this invention and which will be subsequently described in more detail. When the press is in loading position the valve port 32a is blocked off so that fluid is trapped in the pull back cylinders 15, preventing forward movement of the rams 12 and 14 even though the same are under pressure.

During the loading and pre-fill stages of press operation it is of course necessary to block off conduit 25 from the high pressure source 21. And in accordance with the preferred teachings of the invention this is accomplished by providing a pilot pressure conduit 33 which communicates with the enlarged upper end of the valve plunger 26 and with the high pressure fluid source so that the plunger is maintained in a lowered or closed position. As shown in Figure 1 the pilot conduit 33 communicates with a port 32c in the valve 32, and also with a port 32d in the same valve. The port 32c has a poppet type valve C therein communicating with an exhaust passage 34, and while the press is in its loading and pre-fill phases this valve is maintained in a closed condition. The port 32c also communicates through an internal passage in the valve 32 with a port 32d in the valve, the path of communication including a poppet type valve D which is arranged to be in an open position while the press is in loading position.

Communicating with the port 32d is a conduit 35 which connects with conduit 29 and hence with the high pressure source 21. Thus, it will be observed in Figure 1 that with the valves C and D disposed in closed and open positions respectively there is direct communication between the pilot conduit 33 and the source 21 whereby the plunger 26 is maintained in a closed position.

In ports 32a and 32b of the valve 32 there are positioned poppet type valves A and B respectively which are maintained in a closed condition during the loading stage of press operation. Valve A establishes or interrupts communication between the port 32a and the exhaust passage. While valve B establishes or interrupts communication between port 32a and still another port 32b in the valve 32, the last mentioned port having communication with the high pressure source 21 through conduits 36' and 29.

In a normal operating cycle of the illustrated extrusion press apparatus a billet, not shown, of material to be extruded is positioned in the container 18 and the extruding plunger 17 is advanced rapidly, and under low pressure, into initial contact with the billet. To effect a rapid advance or pre-fill of the press the valve A is opened by lifting the stem thereof upwardly. This opens conduits 30 and 31 to the exhaust passage 34 and permits the escape of fluid from the pull back cylinders 15. The ram 12 will of course advance at this time inasmuch as the same, as well as the auxiliary rams 14, is maintained under pre-fill pressure from the source 20.

After initial contact has been made with the billet to be extruded, high pressure fluid is applied to the rams 12 and 14, and this is effected in the apparatus of the present invention by opening valve C and closing valve D, while at the same time maintaining valve A in an open position. Upon closing of valve D and opening of valve C the pilot conduit 33 is opened to exhaust and the main valve plunger 26 opens in response to pressure applied to the lower side thereof through conduit 27. High pressure fluid then flows through conduits 25 and 22 into the cylinders 11 and 13 of the press, causing the rams to move forwardly to effect an extruding operation. Valve A, remaining open during this stage, permits the continued escape of fluid from the pull back cylinders 15 as the press advances.

During the extruding operation proper, the speed of advance of the extruding plunger may be regulated by means of the throttling valve 28. Preferably suitable remotely operable power means, such as gear motor 28', are provided for regulating the valve 28.

To return the rams 12 and 14 to loading position following a completed extruding operation valves A and C are closed while valves B and D are opened. As heretofore explained, the respectively open and closed valves D and C effect the application of high pressure fluid to the pilot conduit 33 whereby valve 26 is closed, shutting off the supply of high pressure fluid to the main and auxiliary rams 12 and 14. And with the opening of valve B the pull back cylinders 15 are connected to the high pressure source of fluid 21 tending to cause a rapid retracting movement of the rams 12 and 14.

In order to permit the escape of fluid from the cylinders 11 and 13 during retraction of the rams there is provided a pilot conduit connection 36 leading from conduit 31 to the pilot pistons of valves 23 and 63, the arrangement being such that the application of pressure through this pilot conduit tends to open the valves 23 and 63, establishing communication between the cylinders 11 and 13 and the low pressure source of pre-fill fluid at 20. The opposite sides of the pilot pistons are also provided with a pilot conduit connection 37 leading to the high pressure source through conduit 29. And this last mentioned pilot connection opposes the first mentioned, and tends at all times to maintain the pilot pistons in a bottomed condition, or the left as viewed in Figure 1. However, the effective area of the right side of the pilot pistons is somewhat less than the effective area of the left side when the pilot pistons abut against the valve stems and application of equal pressure to both sides therefore causes the pistons to be moved toward the right, opening valves 23 and 63. At all other times the pressure in pilot conduit 37 maintains the pilot pistons in a bottomed condition, conduit 36 being open to exhaust.

In accordance with the teachings of the invention the operation of the press apparatus is controlled by means of a novel control apparatus or system, of which the valve 32 forms an important part. This valve, which is shown in greater detail in Figures 2–5 of the drawing, comprises a main block or body portion 38 which is supported rigidly above a base member 39. The block 38 is provided with a plurality of vertical bores, spaced on either side of the center axis of the block, in which are received cartridge assemblies 40, 41, 42 and 43 constituting valves A, B, C and D respectively as designated in Figure 1. Each of the cartridges 40–43 is provided with an operating rod designated by the sub letter "a," as indicated in Figure 5. And in accordance with the preferred construction the operating rods of the respective valves A–D extend downwardly below the block or body member 38, the arrangement being such that when the operating rod of any valve is in its lowermost position the valve is closed, while upward movement of the operating rod causes the valve to open. This is substantially as indicated schematically in Figure 1 as will be readily understood.

Journaled below the block 38 and below the lower end portions of the valve operating rods 40a–43a is a shaft 44 having a plurality of longitudinally spaced cam-like projections 44' extending laterally therefrom and underlying the respective operating rods 40a–43a. As illustrated in Figure 4 the valve cartridges 40–43 are positioned alternately on opposite sides of the shaft 44, and the arrangement is such that rotation of the shaft 44 in a first direction can effect the opening of only two of the four valves, while it is necessary to rotate the shaft 44 in the opposite direction to open the remaining valves. Other arrangements of the valve cartridges are of course contemplated by this invention, depending upon the control effects and sequencing desired.

Positioned immediately above the cam-like projections 44', and underlying the valve operating rods are tappets 45 having adjusting means 46 at the upper end thereof for either extending or reducing the effective length of the tappets. A bushing 47 guides each tappet 45 in longitudinal movement, and the plurality of such bushings 47 are mounted in fixed relation to the block 38 by means of a mounting plate 48. The tappets 45 move upwardly and downwardly in their respective guide bushings 46 in response to movement of the cams 44'. And, in turn, the valve operating rods 40a–43a are caused to move upwardly and downwardly by means of the tappets 45.

In the illustrated embodiment of the invention the tappet for operating valve C in cartridge 42 is adjusted so as to have substantial clearance with the operating stem for valve C, while no such substantial clearance is provided with respect to the operating stem for valve A in cartridge 40, so that upon rotation of the shaft 44 in a direction to open valves A and C the valve A will open before driving connection is established between the operating rod for valve C and the tappet 45 associated therewith. And the construction is such that upon further rotation of the shaft 44 in the same direction both valves A and C will be caused to open.

The arrangement of the main valve assembly 32 is such that for each of four different rotative positions of the shaft 44 the valves A–D are differently disposed, one rotative position of the shaft 44 setting the valves for the pre-fill stage of press operation, another position setting the valves for the extrusion stage, and so on. Thus, referring again to Figure 1, it will be observed that the shaft 44 is disposed in a "neutral" position wherein valves A, B, and C are closed while valve D is maintained in an open position. With the valves so arranged the press is held in a loading or fully retracted position as heretofore explained. Upon rotation of the shaft 44 a few degrees in a clockwise direction (as viewed from the right hand end of the shaft) valve A will be caused to open. Valve D does not close at this time since the tappet 45 therefor is adjusted to maintain it in open condition except upon substantial rotation of the shaft 44 in a clockwise direction. And valve C does not open at this time as its operating tappet 45 is adjusted to prevent opening except upon substantial rotation of the shaft. It is understood, of course, that by "substantial" rotation, a rotation of perhaps twenty degrees is contemplated. While a rotation of in the order of ten degrees is sufficient to open valve A.

Thus, it will be observed that upon an initial relatively small clockwise rotation of the shaft 44 valves A and D will be open. And at this time the rams 12 and 14 advance rapidly under pre-fill pressure as heretofore described.

Upon further or "substantial" clockwise rotation of the shaft 44 valve D closes and valve C opens, valve A remaining open, so that high pressure is directed to the operating cylinders of the press for carrying out an extruding operation.

To return the press to a loading position, following an extruding operation, the shaft 44 may be rotated in a counterclockwise direction, through the normal or "neutral" position, to a position a few degrees counterclockwise of neutral. In this rotative position of the shaft 44 valves A and C are closed, while valves B and D are open, effecting a reverse or retracting movement of the press as heretofore described.

It will be apparent, then, that by merely rotating the shaft 44 through an arc of in the order of thirty to forty degrees all four principal stages of press operation may be effected.

In accordance with the teachings of the invention I provide for the remote automatic operation of the valve assembly by connecting to the shaft 44, preferably at one end thereof, a suitable driving motor 49 which is provided with gear reduction means indicated generally at 50 whereby substantial rotation of the motor is effective to produce only a small rotation of the shaft 44. The gear reduction means 50 preferably includes a planetary type gear arrangement, as shown in Figure 6, having a central or sun gear 50a, a plurality of intermediate or planetary gears 50b, and an outer ring gear 50c. Gear 50a is driven by the motor 49 and cooperates with the ring gear 50c, which is normally fixed, to drive the plurality of planetary gears 50b at reduced speed. The gears 50b are rotatably carried by a common spider element which has driving connection with the valve operating shaft 44. The arrangement is such that the shaft 44 has a highly reduced movement with respect to the motor 49. As shown schematically in Figure 1 the driving motor and gear reduction means may be axially aligned with shaft 44 and directly coupled therewith or, as shown in Figure 4, offset laterally from the shaft and interconnected therewith by suitable gearing indicated generally at 65.

Further in accordance with the teachings of the invention, there is provided a clutch arrangement for releasing the normally fixed ring gear 50c so that the same may freely rotate, permitting movement of the shaft 44 independently of the motor 49. The clutch arrangement may comprise a dog pin 52' adapted to engage a notch provided therefor in the ring gear 50c and adapted upon movement of a clutch lever 52 to be withdrawn from such notch to permit free rotation of the gear 50c.

In the preferred apparatus the clutch arrangement includes means, not specifically indicated for releasing the pin 52' during the first revolution of the drive motor 49 so that the same may obtain considerable inertia prior to driving the shaft 44. This is an important feature since there is substantial pressure against the valves 40–43, when closed, and substantial force is required to open the same. This pressure is of course released as the valves are cracked open.

To prevent undesired movements of the shaft 44 there is provided a magnetic brake device 51 which is arranged, when energized, to frictionally engage the shaft 44, preventing rotation thereof. Whenever it is desired to adjust the position of the shaft 44 the brake 51 is deenergized. And suitable automatic and/or manual means, not shown, may be provided for this purpose.

Keyed to the opposite end of the shaft 44 is a short lever-like member 53. And carried on the shaft 44 adjacent the member 53, but being freely rotatable on the shaft is an elongated upwardly extending operating lever 54 having a handle portion 55 at one end. Near its upper end the lever-like member 53 carries a retractible pin assembly 56 which may be selectively engaged with the operating lever 54 to effect a driving connection therebetween. The arrangement is such that the lever 54 is maintained in a normally inoperative condition, while by merely engaging the pin assembly 56 a driving connection is effected between the lever 54 and the shaft 44. Usually it is desirable to provide suitable detent means, as at 57, for releasably engaging the lever 54 with the body of the valve assembly in any of the operative rotative positions of the shaft 44.

Connected with the shaft 44 by any suitable means is one of a pair of selsyn motors 58 which is provided with electrical connections with a second selsyn 59 located at a remote control station, indicated at 60 in Figure 1. In the presently illustrated apparatus the first mentioned selsyn motor 58 serves in the capacity of a "transformer motor" while the remotely positioned motor 59 serves as a "transmitter." And connected to the transmitter motor 59 is a control lever 61 positioned on the control console or pulpit 60. Electrically associated with each of the selsyn motors 58 and 59 is a control panel 62 having means therein to sense electrical potential generated by the motors 58 and 59 and in response thereto to energive the gear motor 49 to rotate the shaft 44 and the transformer selsyn associated therewith.

It will be understood, of course, that the selsyn motors 58 and 59 are conventionally connected so that when there is a displacement of the rotor member of either motor with respect to the mating motor of the pair an electrical potential is generated which may be transmitted to the control panel 62 and therein translated so as to energize one of two relays, not specifically shown, to rotate the motor 49 in either a forward or reverse direction, whichever direction tends to restore the selsyn motors 58 and 59 into alignment. Thus, it will be further understood that by mere manipulation of the control lever 61 at the control station 60 the shaft 44 of the valve assembly 32 may be moved into any one of its operative rotative positions to operate the extrusion press apparatus in the manner heretofore described. And, of course, the selsyn motors 58 and 59 may be connected in geared-up relation to the shaft 44 and control lever 61 so that high accuracy of movement is obtained.

Suitable indicia, not shown, may be provided at the control station 60 to indicate the position to which the lever 61 should be manipulated to effect a desired stage of press operation.

During normal operation of the press apparatus the clutch mechanism 52—52' locks the ring gear 50c, connecting the shaft 44 with the driving motor, while the engaging pin assembly 56 is retracted, rendering the manual control lever 54 inoperative. In the event of power failure or other mishap, however, the clutch may be quickly disengaged by shifting the lever 52, while the pin assembly 56 may be quickly engaged. The arrangement is such that while control of the press is ordinarily carried out by remotely positioned automatic means, a quick and simple manual take-over is provided. This is an important advantage in extrusion press operation, and forms an important part of this invention.

Many of the advantages of the present invention are made possible by my novel valve assembly having a plurality of valve members therein operable in desired sequence upon a relative small rotational movement of the shaft 44. The arrangement is such that the substantially entire press operation cycle may be effected remotely through servo devices including but a single pair of selsyn motors. And the design is further such that manual operation of the valve assembly may be readily effected through the manipulation of a single manual control lever, movable through a relatively small path of movement.

In the many novel features of my apparatus there is included the combination of a pilot operated main flow control valve, for withholding or permitting the flow of fluid under pressures in the order of 5000 p.s.i., with the main control valve assembly whereby smooth and precise control of these extremely high pressures may be advantageously effected with the same control means employed in effecting other stages of the press cycle.

A further important advantage of my invention resides in the ease and accuracy with which throttling control over press movements may be effected from a remote control station. Thus, during the pre-fill stage of press movement, wherein the extruding plunger is advanced rapidly toward a billet to be extruded, it is often desirable to gradually decelerate the press as it nears and moves into contact with the billet. In the present control assembly pre-fill is effected by permitting the controlled escape of fluid from the pull back cylinders 15 of the press, and this is in turn controlled by opening and closing valve A of the control assembly. As will be readily apparent, through either remote or manual control the shaft 44 may be rotated to any position intermediate its regular control positions, wherein, for example, the valve A is only partially open, permitting a slower escape of fluid from the pull back cylinders.

Having thus described my invention in one of its preferred forms, what I claim as new and desired to secure by Letters Patent is:

1. In an extrusion press having an extrusion ram reciprocable within a main ram cylinder and a pull-back cylinder, hydraulic fluid control apparatus comprising a source of low pressure fluid connected to said main ram cylinder to effect rapid initial movement of said ram during a cycle of operation, a source of high pressure fluid, a high pressure valve assembly comprising a plurality of ports and a separate valve for each port operated by a common cam shaft, means comprising second valve means to direct high pressure fluid into said main ram cylinder, said second valve means having a chamber with a plunger therein, said valve having an inlet and outlet port and a pilot control port, means comprising a pair of said ports in said high pressure valve for directing high pressure fluid to said pilot control port to move said plunger to block said outlet port whereby high pressure fluid is blocked from said main ram cylinder, means to rotate said cam shaft comprising a motor for selectively driving said shaft in opposite directions whereby upon proper actuation of said motor said shaft is rotated to shift the valves for said pair of ports to block the flow of high pressure fluid to said pilot control port and thereby allow high pressure fluid to flow to said ram, and means comprising other of said ports to admit high pressure fluid to said pull-back cylinder while simultaneously connecting said main ram cylinder to said source of low pressure fluid.

2. Apparatus according to claim 1 further characterized in that said means comprising said second valve means comprises a throttling valve, and means to regulate said last mentioned valve to adjustably control the rate of movement of said ram.

3. Apparatus according to claim 1 further characterized by means to control the energization of said motor comprising a position sensing device coupled with said shaft and an interconnected position controlling device operated by a control-pulpit-located lever.

4. Hydraulic fluid control apparatus for an extrusion press having a main ram cylinder and a pull-back cylinder, comprising a source of low pressure fluid, a source of high pressure fluid, four high pressure valve devices each having an inlet port, an outlet port and a valve member interposed between said inlet and outlet ports, cam means for separately operating said valve members in a sequence of steps, conduit means connecting said high pressure source to the inlet ports of the second and fourth of said valve devices, means connecting the outlet ports of said second and fourth valve devices to the inlet ports of the first and third of said valve devices respectively, conduit means connecting said outlet port of the second valve device to said pull-back cylinder, a fifth valve having an inlet and outlet port and a pilot control port, conduit means connecting said outlet port of the fourth valve device to said pilot control port, conduit means connecting said high pressure source to the inlet port of said fifth valve, conduit means connecting the outlet port of said fifth valve to one end of said main ram cylinder, a check valve having an inlet port, an outlet port and a pilot control port, conduit means connecting the pilot control port of said check valve to the outlet port of said second high pressure valve device, conduit means connecting said low pressure source to the inlet port of said check valve, and means connecting the outlet port of said check valve to said one end of the main ram cylinder.

5. Hydraulic fluid control apparatus for an extrusion press having a main ram cylinder and a pull-back cylinder, comprising a source of low pressure fluid, a source of high pressure fluid, two high pressure valve devices each having an inlet port, an outlet port and a valve member interposed between said inlet and outlet ports, means including cams located on a common shaft for separately operating said valve members in a sequence of steps, conduit means connecting said high pressure source to the inlet port of said second high pressure valve device, conduit means connecting the outlet port of said second valve device to the inlet port of the first high pressure valve device, conduit means connecting said outlet port of the second valve device to said pull-back cylinder, means connecting said source of high pressure fluid to one end of said main ram cylinder, and a check valve having an inlet port connected to said source of low pressure fluid and an outlet port connected to said one end of the main ram cylinder.

References Cited in the file of this patent
UNITED STATES PATENTS

| | | |
|---|---|---|
| 1,245,574 | Dean | Nov. 6, 1917 |
| 1,317,238 | Summey | Sep. 30, 1919 |
| 1,365,541 | Rankin | Jan. 11, 1921 |
| 2,142,704 | Sparks | Jan. 3, 1939 |
| 2,164,511 | Furlong | July 4, 1939 |
| 2,164,640 | Cannon | July 4, 1939 |
| 2,192,778 | Stacy | Mar. 5, 1940 |
| 2,214,271 | Camerota | Sep. 10, 1940 |
| 2,228,700 | Hamner | Jan. 14, 1941 |
| 2,240,163 | Pick | Apr. 29, 1941 |
| 2,351,317 | Camenota | June 13, 1944 |
| 2,401,450 | Alexanderson | June 4, 1946 |
| 3,566,945 | Laze | Sep. 4, 1951 |
| 2,636,406 | Salter | Apr. 28, 1953 |
| 2,660,052 | Uhl | Nov. 24, 1953 |
| 2,751,076 | Lombard | June 19, 1956 |

FOREIGN PATENTS

| | | |
|---|---|---|
| 476,076 | Germany | June 19, 1956 |
| 399,147 | Italy | 1941 |

OTHER REFERENCES

"Model ET Time Totalizer," Sales circular published by the R. W. Cramer Co., Centerbrook, Conn. Jan. 20, 1953.